(12) United States Patent
Amasaki et al.

(10) Patent No.: US 12,162,088 B2
(45) Date of Patent: Dec. 10, 2024

(54) ROTATING TOOL FOR AND METHOD OF FRICTION STIR WELDING

(71) Applicants: Mitsubishi Electric Corporation, Tokyo (JP); OSAKA UNIVERSITY, Suita (JP)

(72) Inventors: Tetsuya Amasaki, Osaka (JP); Hidetoshi Fujii, Osaka (JP); Keisuke Murase, Tokyo (JP); Seiiyu Ishimoto, Tokyo (JP); Takuya Ikeda, Tokyo (JP); Muneaki Mukuda, Tokyo (JP); Takushi Takizawa, Tokyo (JP); Naohiko Harada, Tokyo (JP); Shigenobu Tochiyama, Tokyo (JP)

(73) Assignees: Mitsubishi Electric Corporation, Tokyo (JP); OSAKA UNIVERSITY, Osaka (JP)

( * ) Notice: Subject to any disclaimer, the term of this patent is extended or adjusted under 35 U.S.C. 154(b) by 241 days.

(21) Appl. No.: 16/803,121

(22) Filed: Feb. 27, 2020

(65) Prior Publication Data

US 2020/0361025 A1    Nov. 19, 2020

(30) Foreign Application Priority Data

May 16, 2019    (JP) .................................. 2019-092700

(51) Int. Cl.
*B23K 20/12*    (2006.01)
*B23K 103/10*   (2006.01)

(52) U.S. Cl.
CPC ...... *B23K 20/1255* (2013.01); *B23K 2103/10* (2018.08)

(58) Field of Classification Search
None
See application file for complete search history.

(56) References Cited

U.S. PATENT DOCUMENTS 6,994,242 B2 *  2/2006  Fuller .............. B23K 20/1255
                                            228/112.1
7,275,675 B1 * 10/2007  Carter .............. B23K 20/1255
                                            228/2.1

(Continued)

FOREIGN PATENT DOCUMENTS

GB          2306366 A  *  5/1997   ......... B23K 20/1255
JP       2003-136256 A      5/2003

(Continued)

OTHER PUBLICATIONS

Mishra et al. "Friction Stir Welding and Processing", ASM International, p. 18, 2007. (Year: 2007).*

(Continued)

*Primary Examiner* — Devang R Patel
(74) *Attorney, Agent, or Firm* — Sughrue Mion, PLLC; Richard C. Turner

(57) ABSTRACT

A pressure receiving surface inclined to a rotation axis is provided on the side surface of a stir probe of a rotating tool. The pressure receiving surface includes a pressure receiving region which is always perpendicular to a rotation tangential direction in a cross section perpendicular to the rotation axis. In friction stir processing, the stir probe is caused to rotate in a rotation direction B in which the normal direction of the pressure receiving surface is positive. According to this kind of rotating tool, as it has no shoulder, a joint width does not increase even when a stirring region is deep, and also, a plastic flow in a rotation direction is generated by a pressure receiving surface, so that it is possible to reduce the proportion of the plastic flow in the rotation axis direction, and thus possible to suppress an occurrence of burr.

7 Claims, 8 Drawing Sheets

(56) References Cited

U.S. PATENT DOCUMENTS

| | | | | |
|---|---|---|---|---|
| 7,942,306 B2* | 5/2011 | Burford | ............ | B23K 20/1255 |
| | | | | 228/13 |
| 8,579,180 B2* | 11/2013 | Burford | ............ | B23K 20/1255 |
| | | | | 228/2.1 |
| 2007/0057015 A1* | 3/2007 | Colligan | ............ | B23K 20/1255 |
| | | | | 228/2.1 |
| 2010/0081005 A1* | 4/2010 | Aoh | ................ | B23K 20/1255 |
| | | | | 228/2.1 |
| 2016/0008918 A1* | 1/2016 | Burford | ............ | B23K 20/1255 |
| | | | | 228/112.1 |
| 2017/0259371 A1* | 9/2017 | Kato | ................... | B23K 20/125 |
| 2018/0043465 A1* | 2/2018 | Hori | .................... | B23K 20/127 |
| 2018/0207746 A1* | 7/2018 | Yamaguchi | .......... | B23K 20/124 |
| 2018/0250767 A1* | 9/2018 | Hori | .................... | B23K 20/124 |
| 2019/0061046 A1* | 2/2019 | Fleck | ................... | B23K 20/129 |

FOREIGN PATENT DOCUMENTS

| | | |
|---|---|---|
| JP | 61-12175 B2 | 4/2017 |
| JP | 2019-10674 A | 1/2019 |

OTHER PUBLICATIONS

Communication dated Jan. 12, 2021, from the Japanese Patent Office in application No. 2019-092700.
Communication issued Jul. 15, 2021 by the Chinese Patent Office in Chinese Application No. 202010392427.6.
Notification of reasons for refusal dated Jun. 9, 2020, from the Japanese Patent Office in Application No. 2019-092700.

* cited by examiner

|  | ROTATION SPEED (rpm) | JOINING SPEED (mm/min) | OCCURRENCE STATUS OF BURR | DAMAGE OCCURRENCE JOINING DISTANCE (m) |
|---|---|---|---|---|
| FIRST WORKING EXAMPLE | 10,000 | 1,000 | ◯ | 200 |
|  | 15,000 | 3,000 | ◯ | 150 |
| SECOND WORKING EXAMPLE | 10,000 | 1,000 | ◯ | 130 |
|  | 15,000 | 3,000 | △ | 100 |
| FIRST COMPARISON EXAMPLE | 7,000 | 600 | ✕ | 50 |
|  | 10,000 | 1,000 | ✕ | 40 |

ROTATING TOOL FOR AND METHOD OF FRICTION STIR WELDING

BACKGROUND OF THE INVENTION

Field of the Invention

The present application relates to the fields of a rotating tool for and a method of friction stir welding.

Description of the Related Art

As a method of joining metal members together, friction stir welding using a rotating tool connected to a rotation axis is known. In the friction stir welding, the rotating tool which rotates at high speed is abutted and pressed against the surface of to-be-joined members, and thereby metal in the vicinity of a joint portion is softened by the heat of friction and the action of stirring, generating a plastic flow. The metal materials of the to-be-joined members are stirred by the plastic flow, joining two or more to-be-joined members together.

A common rotating tool used for the friction stir welding includes a shoulder which is pressed against the surface of to-be-joined members and a stir probe provided at the leading end of the shoulder. For example, when the thickness of the to-be-joined members is large, when carrying out lap joint welding, a stirring region is deep, and the torque and resistance applied to the rotating tool increases, so that it is necessary to increase the cuter diameter of the shoulder and stir probe. On the other hand, when the outer diameter of the stir probe is increased, a joint width increases, increasing the load on a friction stir welding device.

In order to reduce the joint width and the load when joining, it is effective to reduce the outer diameter of the shoulder or to eliminate the shoulder. When there is no shoulder, however, a plastic flow layer cannot be restrained from flowing, as burr, to a metal surface, raising the problem of a deterioration in joining strength due to a decrease in the wall thickness of a joint portion. Also, as the heat of friction caused by the shoulder is not supplied, the load on the stir probe increases when the stirring region is deep, and damage to the stir probe is likely to occur.

With respect to these kinds of problems, for example, Patent Literature 1 discloses a rotating tool, at the leading end portion of which is provided a spiral, approximately V-shaped groove, and the groove is set so that the area of an anti-insertion side inclined surface is equal to or larger than the area of an insertion side inclined surface. It is described, in this related art example, that the leading end portion is formed in a tapered shape by adopting the above-mentioned threaded structure, and thereby it is possible to make the processing width narrower and the processing depth deeper when friction stirring, and thus possible to effectively suppress a protuberance of the plastic flow layer to the surface side.

[Patent Literature 1] JP-A-2003-136256

As described above, it is required, in the rotating tool for friction stir welding, that the joint, width does not increase even when the stirring region is deep, and the load on the friction stir welding device does not increase, and in addition, that an occurrence of burr can be suppressed. By realizing this kind of rotating tool, it is possible to carry out high-speed joining wherein a high-speed rotation is combined with a high-speed movement, achieving an improvement in productivity.

In the rotating tool disclosed in Patent Literature 1, however, when attempting to reduce the outer diameter of the stir probe, the difference between the area of the anti-insertion side inclined surface and the area of the insertion side inclined surface decreases naturally. Because of this, even though the shoulder can be eliminated, it is difficult to make the outer diameter of the stir probe smaller than that of the stir probe of the common rotating tool. Also, whether or not the burr can actually be suppressed in the rotating tool disclosed in Patent Literature 1 depends largely on the rotation speed when joining. For this reason, it is considered that there is a limit to the rotation speed at which the occurrence of burr can be suppressed.

SUMMARY OF THE INVENTION

The present application has been made to solve the above problem, and an object of the present application is to provide a rotating tool for and a method of friction stir welding whereby a joint width does not increase even when a stirring region is deep, and it is possible to suppress an occurrence of burr.

The rotating tool for friction stir welding disclosed in the present application is a rotating tool for friction stir welding which includes a stir probe, wherein a pressure receiving surface inclined to a rotation axis of the stir probe is provided on a side surface of the stir probe, and the pressure receiving surface includes a pressure receiving region which is perpendicular to a rotation tangential direction in a cross section perpendicular to the rotation axis.

Also, the method of friction stir welding disclosed in the present application is a method of friction stir welding, which joins two or more metal members using a rotating tool including a stir probe, wherein the stir probe has a pressure receiving region which is always perpendicular to a rotation tangential direction in a cross section perpendicular to a rotation axis, and the pressure receiving region is continuously formed along a side surface of the stir probe, thereby forming a pressure receiving surface inclined to the rotation axis, and wherein the rotating tool is caused to rotate in a direction in which the normal direction of the pressure receiving surface is positive, thus friction stir processing a joint portion between the metal members.

According to the rotating tool for friction stir welding disclosed in the present application, as a plastic flow in a rotation direction is generated by the pressure receiving surface, it is possible to reduce the proportion of the plastic flow in the rotation axis direction, and thus possible to suppress the occurrence of burr. Also, as the rotating tool has no shoulder, the joint, width does not increase even when the stirring region is deep.

According to the method of friction stir welding disclosed in the present application, the rotating tool is caused to rotate in a direction in which the normal direction of the pressure receiving surface is positive, thereby generating the plastic flow in the rotation direction, so that it is possible to reduce the proportion of the plastic flow in the rotation axis direction, and thus possible to suppress the occurrence of burr. Also, as the rotating tool has no shoulder, the joint width does not increase even when the stirring region is deep.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

First Embodiment

Figure 1:
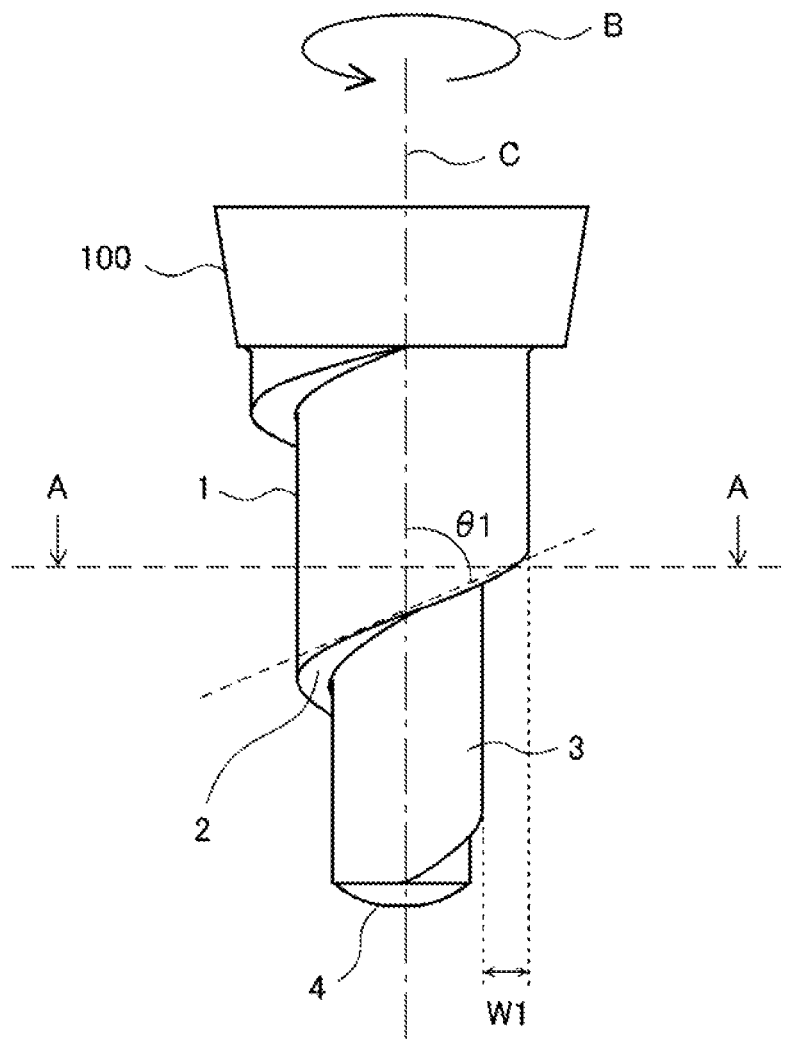
FIG. 1 is a side view showing a rotating tool according to a first embodiment.
Figure 2:
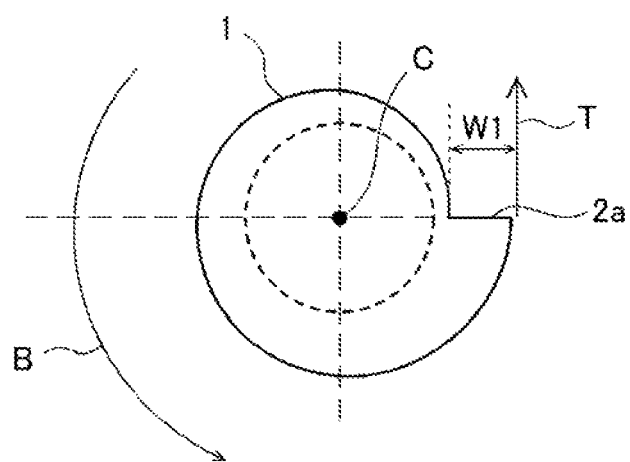
FIG. 2 is a sectional view showing a stir probe of the rotating tool according to the first embodiment.

Hereafter, a description will be given, based on the drawings, of a rotating tool for and a method of friction stir welding according to the first embodiment. FIG. 1 is a side view showing the rotating tool for friction stir welding according to the first embodiment, and FIG. 2 is a sectional view of a stir probe according to the first embodiment with a cross section perpendicular to the rotation axis of the stir probe seen in the direction shown by A in FIG. 1. In the individual drawings, identical signs are given to identical or equivalent portions.

A rotating tool for friction stir welding 100 according to the first embodiment (hereafter referred to as the rotating tool 100) includes at the leading end thereof a stir probe 1. The rotating tool 100 is rotatably supported on a friction stir welding device (not shown and hereafter referred to as the welding device). In the drawing, the dash-dotted line shown by C represents the rotation axis (axis line) of the rotating tool 100 and stir probe 1.

The rotating tool 100 is rotary driven by a drive unit included in the welding device, thereby causing the stir probe 1 to rotate. In the drawing, B is the arrow showing the rotation direction. The drive unit includes a drive motor, with which to cause the stir probe 1 to rotate at high speed, and a drive mechanism which moves the stir probe 1 both in a direction approximately perpendicular to and along the surface of to-be-joined members.

A pressure receiving surface 2 inclined to the rotation axis C is provided on the side surface of the stir probe 1. The pressure receiving surface 2, as shown in FIG. 2, includes a pressure receiving region 2a perpendicular to a rotation tangential direction (in FIG. 2, shown by T) in a cross section perpendicular to the rotation axis C. That is, the pressure receiving region 2a which is always perpendicular to the rotation tangential direction T in the cross section perpendicular to the rotation axis C is continuously formed along the side surface of the stir probe 1, thereby forming the pressure receiving surface 2 inclined to the rotation axis C. The pressure receiving surface 2 has the function of causing a plastic flow layer generated by the rotation of the stir probe 1 to flow in the rotation direction.

The stir probe 1 has on the side surface thereof a step formed by the pressure receiving surface 2, and thereby the outer diameter of the stir probe 1 decreases toward a leading end portion 4. The step formed by the pressure receiving surface 2 is spirally formed along a rotation axis direction. In the stir probe 1 according to the first embodiment, when the angle defined by the pressure receiving surface 2 and the rotation axis C is set to $\theta 1$ as shown in FIG. 1, $\theta 1=45°$. However, the angle $\theta 1$ defined by the pressure receiving surface 2 and the rotation axis C, not being limited to 45°, has only to be an inclination angle of $0°<\theta 1<90°$.

Also, the stir probe 1 has a non-pressure receiving surface 3 extending in the rotation axis direction. In the first embodiment, the non-pressure receiving surface 3 is parallel to the rotation axis C. A pressure receiving width W1 does not have to be constant and is not particularly limited. Also, in the first embodiment, the non-pressure receiving surface 3 and the pressure receiving region 2a are perpendicular to each other.

A description will be given, using FIG. 3, of the method of friction stir welding whereby two or more metal members, here, to-be-joined members 14a, 14b are lap joined using the rotating tool 100 according to the first embodiment. When the rotating tool 100 is caused to rotate at high speed by the drive unit, and the stir probe 1 is abutted and pressed against a surface 141 of the to-be-joined member 14a, metal in the vicinity of the stir probe 1 is softened, generating a plastic flow. The leading end portion 4 of the stir probe 1 is inserted up to a joint portion 16 between the to-be-joined members 14a, 14b, and the metal around the joint portion 16 is caused to plastic flow and kneaded and mixed, thereby integrating the to-be-joined members 14a, 14b. The two to-be-joined members 14a, 14b are thereby joined together.

Figure 3:
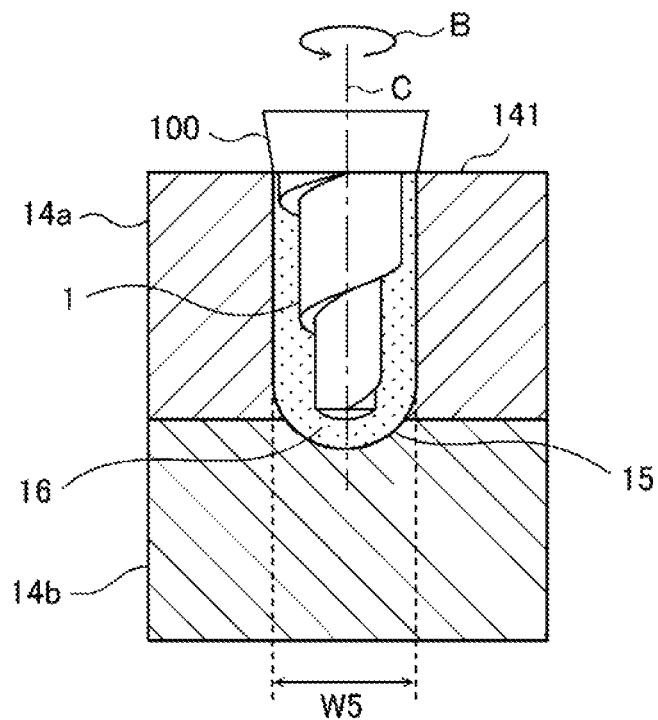
FIG. 3 is a schematic diagram describing lap joining using the rotating tool according to the first embodiment.

In FIG. 3, a plastic flow layer is generated in a stirring region 15 including the joint portion 16 between the to-be-joined members 14a, 14b. A joint width W5 at this time is about slightly larger than the outer diameter of the stir probe 1, and an apparent joint width in the vicinity of the surface 141 of the to-be-joined member 14a is as large as an actual joint width in the joint portion 16.

In this friction stir processing, the stir probe 1 is caused to rotate in a direction in which the normal direction of the pressure receiving surface 2 is positive. That is, in FIG. 2, the stir probe 1 is caused to rotate in the rotation direction B in which the normal direction of the pressure receiving region 2a is positive. For this reason, when the stir probe 1 rotates, a plastic flow in the rotation direction is generated by the pressure receiving surface 2, as a result suppressing a plastic flow in the rotation axis direction (i.e., in the direction opposite the direction of insertion of the stir probe 1).

Figure 4:
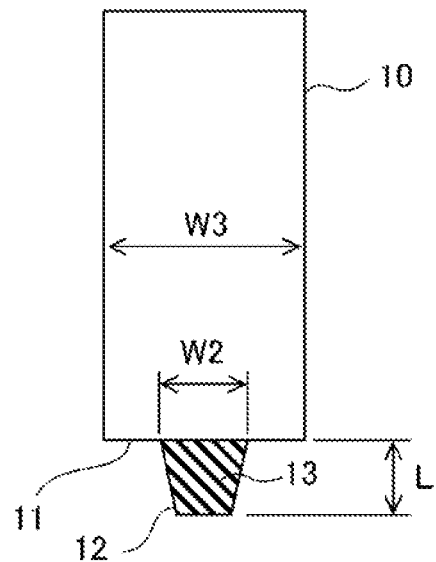
FIG. 4 is a side view showing a rotating tool with a shoulder which is a comparison example.
Figure 5:
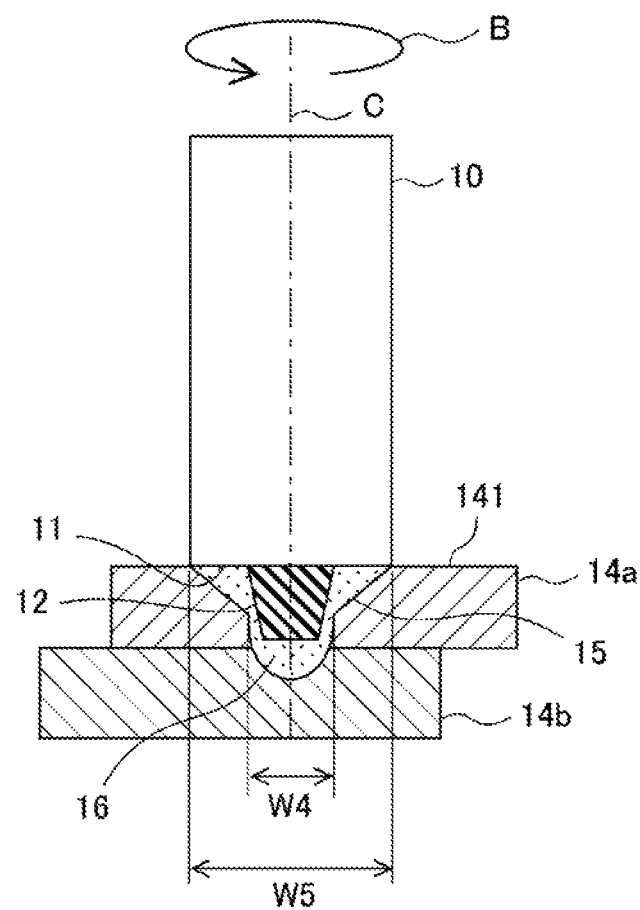
FIG. 5 is a schematic diagram describing lap joining using the rotating tool with the shoulder which is the comparison example.

Next, a description will be given, using FIGS. 4 and 5, of a rotating tool with a shoulder, which is a comparison example of the first embodiment. In FIGS. 4 and 5, W2 is a stir probe outer diameter, W3 a shoulder outer diameter, W4 a joint width, and W5 an apparent joint width. A length L of a stir probe 12 is set to be about the same as or somewhat longer than the thickness of the to-be-joined member 14a.

As shown in FIG. 4, a rotating tool 10 according to the comparison example includes a shoulder 11 and the stir probe 12, and a common thread groove 13 is cut on the side surface of the stir probe 12. In friction stir processing using the rotating tool 10, a joint portion 16 between to-be-joined members 14a, 14b is friction stirred by the stir probe 12, and a surface 141 of the to-be-joined member 14a is held down by the shoulder 11, so that the heat of friction caused by the shoulder 11 is complemented. As shown in FIG. 5, the joint width W4 in the joint portion 16 is about slightly larger than the stir probe outer diameter W2, but in the vicinity of the surface 141 of the to-be-joined member 14a, the apparent joint width W5 is made as large as the shoulder outer diameter W3 by friction stirring by the shoulder 11.

In general, when using the stir probe 12 including the thread groove 13, metal in the vicinity of the stir probe 12 is softened by the rotational motion of the stir probe 12, generating a plastic flow in the direction of rotation following the rotation of the stir probe 12 and a plastic flow in the rotation axis direction perpendicular thereto (i.e., in the direction opposite the direction of insertion of the stir probe 12). The higher the proportion of the plastic flow in the rotation axis direction, the larger the amount of plastic flow layer, that is, of burr flowing cut from the surface 141 of the to-be-joined member 14a.

As in the comparison example, in a heretofore known rotating tool, the plastic flow in the rotation axis direction is held down by the shoulder, a special threaded structure, or the like, thus suppressing an occurrence of burr. When a rotation speed is increased, however, the plastic flow in the rotation axis direction also increases, so that whether or not the burr can actually be suppressed depends on the combination with the rotation speed when joining. Because of this, in the heretofore known rotating tool, it is necessary to join in the combination of a rotation and a movement (joining) speed at which the burr can be suppressed.

Figure 6:
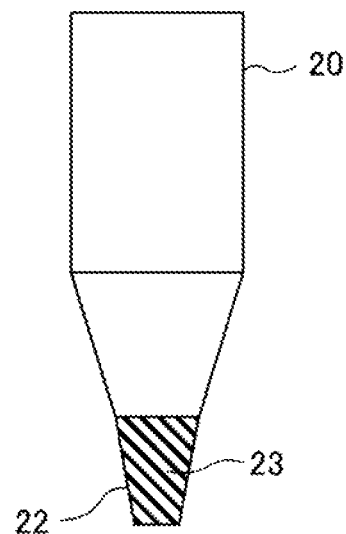
FIG. 6 is a side view showing a rotating tool with no shoulder for burr observation.
Figure 7:
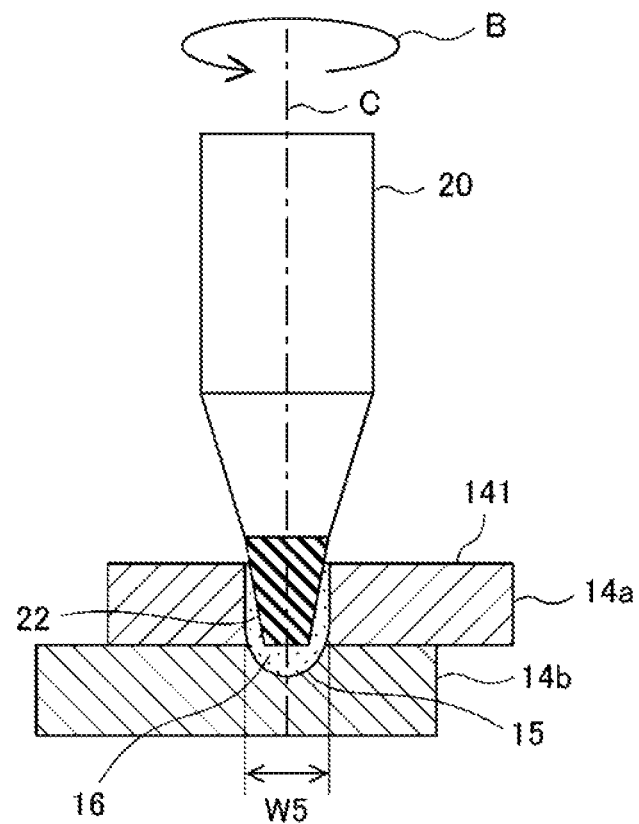
FIG. 7 is a schematic diagram describing lap joining using the rotating tool with no shoulder for burr observation.

In order to confirm the friction stirring behavior of the stir probe alone and the occurrence status of burr, a rotating tool 20 with no shoulder such as shown in FIG. 6 is prepared, carrying out lap joining. A common thread groove 23 is cut on the side surface of a stir probe 22 of the rotating tool 20. As shown in FIG. 7, when using the rotating tool 20 with no shoulder, there is no stirring of friction caused by a shoulder, so that a joint width W5, depending only on the cuter diameter of the stir probe 22, is about the same in the vicinity of a surface 141 of a to-be-joined member 14a as in the proximity of a joint portion 16.

Figure 8:
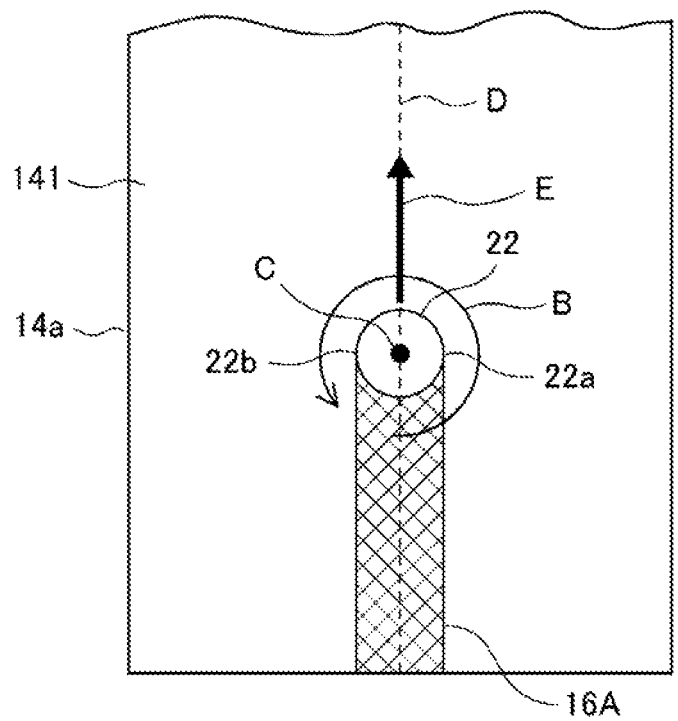
FIG. 8 is a top view describing an operation of joining using the rotating tool with no shoulder for burr observation.

A description will be given, using FIGS. 8 and 9, of a result of confirming the occurrence status of burr by carrying out friction stir processing using the rotating tool 20 with no shoulder shown in FIG. 6. In FIG. 8, D shows a stir probe movement line, and E a movement direction of the stir probe. In the rotating tool 20 with no shoulder, as it has no effect of a shoulder on suppressing a plastic flow layer, it is easy to confirm the occurrence status of burr.

A description will be given, using FIG. 8, of the relationship between the rotation and movement directions of the rotating tool 20. In the stir probe 22 which moves while rotating, there exists an asymmetry between a stir probe advancing side 22a (in FIG. 8, the right side of the stir probe 22), on which the rotation direction B of the stir probe 22 coincides with the movement direction S thereof, and a stir probe retreating side 22b (in FIG. 8, the left side of the stir probe 22), on which the rotation direction B of the stir probe is opposite to the movement direction E thereof, with reference to the stir probe movement line D which the rotation axis C passes.

Figure 9:
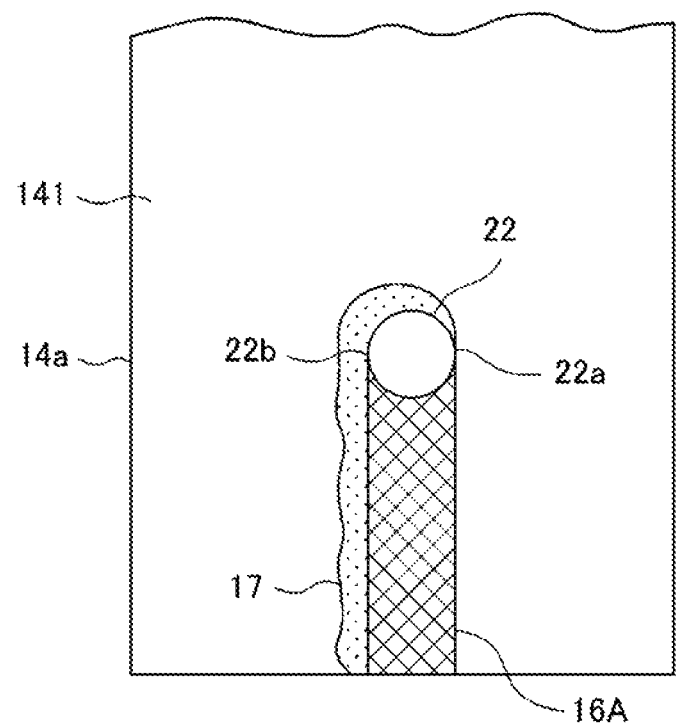
FIG. 9 is a top view describing the occurrence status of burr after the joining using the rotating tool with no shoulder for burr observation.

As a result of observing the occurrence behavior of burr 17, it is confirmed, as shown in FIG. 9, that a plastic flow layer generated originating from the stir probe advancing side 22a starts to flow out from the surface 141 of the to-be-joined member 14a, and that the amount of flow increases toward the stir probe retreating side 22b from the forward side of the stir probe. The plastic flow layer flowing out on the forward side of the stir probe, instead of flowing around to a stir probe backward side joint portion 16A which is on the backward side of the stir probe 22, remains as the burr 17 on the stir probe retreating side 22b.

Friction stir welding is established by friction stirring the to-be-joined members with the rotation of the stir probe, and at the same time, by continuously supplying and filling a space on the backward side of the stir probe with the metal material (plastic flow layer) on the forward side of the stir probe which moves while rotating. The plastic flow layer flows both in the direction of rotation following the stir probe and in the rotation axis direction approximately perpendicular thereto (i.e., in the direction opposite the direction of insertion of the stir probe). When the proportion of the plastic flow in the rotation axis direction is high, and the proportion of the plastic flow in the rotation direction is low, the amount of burr increases, and the metal material is not efficiently filled in the space on the backward side of the stir probe, leading to a decrease in the wall thickness of the joint portion.

In the rotating tool 100 according to the first embodiment, based on this kind of finding, the occurrence of burr is suppressed not by holding down the plastic flow in the rotation axis direction but by increasing the proportion of the plastic flow in the rotation direction and reducing the proportion of the plastic flow in the rotation axis direction. As it is thereby possible to efficiently supply and fill the space on the backward side of the stir probe with the plastic flow layer on the forward side of the stir probe, a high joining strength is obtained without a decrease in the wall thickness of the joint portion, and the proportion of the plastic flow in the rotation axis direction decreases, so that the occurrence of burr is suppressed.

Also, in the first embodiment, as the non-pressure receiving surface 3 of the stir probe 1 is parallel to the rotation axis C, the plastic flow in the rotation direction can be efficiently generated without inhibiting the plastic flow toward the pressure receiving surface 2, and damage due to stress concentration is unlikely to occur, leading to an improvement in the durability of the stir probe. In addition, the joint width can be reduced as compared with in the heretofore known rotating tool with the shoulder, and the load on the welding device does not increase even when the stirring region is deep.

In the case of the stir probe 1 according to the first embodiment, when the pressure receiving width W1 is increased, the pitch of the step increases, and the number of spirals decreases, so that it is difficult to increase the total area of the pressure receiving surface 2. However, the relationship between the number of spirals and the total area of the pressure receiving surface 2 depends on the rotation speed. That is, it is the pressure receiving width W1 that counts rather than the number of spirals, and the total area of the pressure receiving surface 2 can be complemented by increasing the rotation speed. Consequently, when designing the stir probe 1, the outer diameter, the length, the joint width, and the like, are the requirements that should be prioritized, and the larger the number of spirals, the more desirable, but the number of spirals is not a requisite.

For the above reasons, according to the rotating tool 100 according to the first embodiment, as the plastic flew in the rotation direction is generated by the pressure receiving surface 2 including the pressure receiving region 2a perpendicular to the rotation tangential direction T, it is possible to suppress the occurrence of burr. Also, as the rotating tool 100 has no shoulder, the joint width W5 does not increase even when the stirring region 15 is deep, and the load on the welding device does not increase. Furthermore, the effect of the pressure receiving surface 2 on increasing the plastic flow in the rotation direction improves as the rotation speed increases, so that it is possible to apply the rotating tool 100 to high-speed joining wherein a high-speed rotation is combined with a high-speed movement, achieving an improvement in productivity.

Second Embodiment

Figure 10:
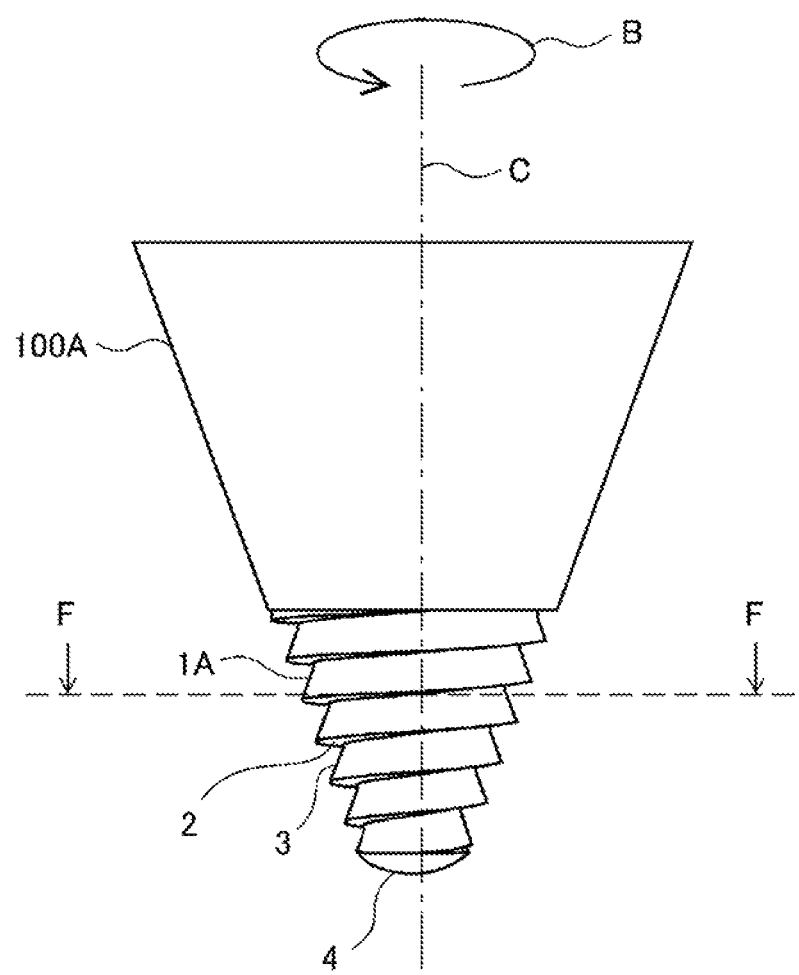
FIG. 10 is a side view showing a rotating tool according to a second embodiment.
Figure 11:
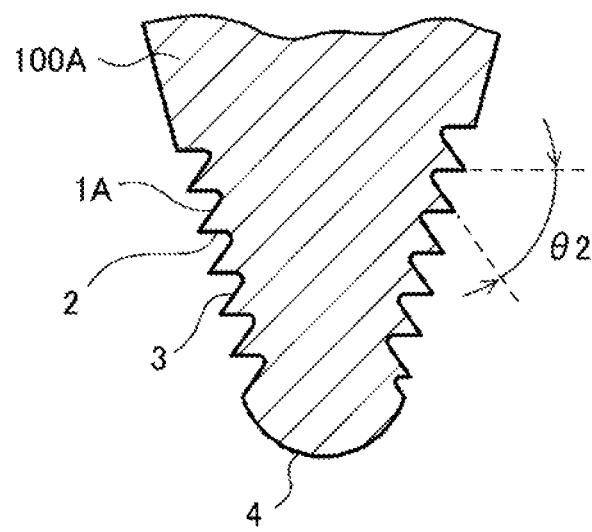
FIG. 11 is a sectional view showing the rotating tool according to the second embodiment.
Figure 12:
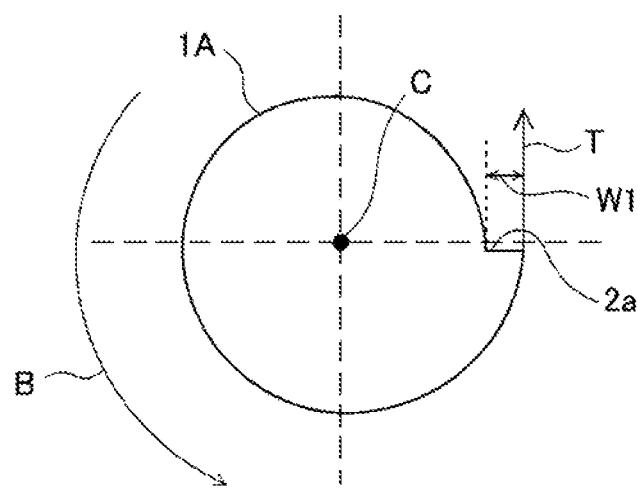
FIG. 12 is a sectional view showing a stir probe of the rotating tool according to the second embodiment.

FIG. 10 is a side view showing a rotating tool according to the second embodiment, and FIG. 11 is a sectional view showing a section parallel to the rotation axis of the rotating tool according to the second embodiment. Also, FIG. 12 is a sectional view of a stir probe according to the second embodiment with a cross section perpendicular to the rotation axis of the stir probe seen in the direction shown by F in FIG. 10. A rotating tool 100A according to the second embodiment includes at the leading end thereof a stir probe 1A. The stir probe 1A is of a tapered shape, the outer diameter of which decreases toward a leading end portion 4, and a pressure receiving surface 2 is formed on a partial portion of the side surface of the stir probe 1A.

The pressure receiving surface 2 provided on the side surface of the stir probe 1A is inclined to a rotation axis C in the same way as in the first embodiment. An angle θ1 (refer to FIG. 1) defined by the pressure receiving surface 2 of the stir probe 1A and the rotation axis C is 0°<θ1<90°. The pressure receiving surface 2, as shown in FIG. 12, has a pressure receiving region 2a perpendicular to a rotation tangential direction T in a cross section perpendicular to the rotation axis C. Also, the pressure receiving surface 2 is spirally provided along the side surface of the stir probe 1A. The working and effect of the pressure receiving surface 2 is the same as in the first embodiment, and so the description thereof is omitted.

The stir probe 1A according to the second embodiment has a non-pressure receiving surface 3 non-parallel to the rotation axis C. When the angle defined by the pressure receiving surface 2 and the non-pressure receiving surface 3 is set to θ2 as shown in FIG. 11, θ2=60°. However, the angle 82 defined by the pressure receiving surface 2 and the non-pressure receiving surface 3, not being limited to this, has only to be in a range of 45°≤θ2<90°. Also, the area of the non-pressure receiving surface 3 is larger than the area of the pressure receiving surface 2.

The stir probe 1A is such that the non-pressure receiving surface 3 is inclined to the rotation axis C, and thereby the pressure receiving surface 2 and the non-pressure receiving surface 3 form an acute angle, and that a threadlike groove is formed toward the leading end portion 4. Because of this, when a pressure receiving surface 2 of the same pressure receiving width as in the first embodiment is provided on the side surface of a stir probe of the same outer diameter as in the first embodiment, the pitch of the groove (in the first embodiment, the pitch of the step) can be reduced, and as a result, the total area of the pressure receiving surface 2 can be increased.

On the other hand, as the non-pressure receiving surface 3 is inclined to the rotation axis C, the non-pressure receiving surface 3 acts so as to inhibit the plastic flow toward the pressure receiving surface 2, and causes the plastic flow in the rotation axis direction to be generated. Because of this, when the rotation speed increases, burr is likely to occur, and stress concentration occurs in the bottom portion of the groove, so that damage is likely to occur. However, these defects can be complemented by adjusting the load with the rotation speed, the joining speed, and the like. It is only necessary, taking into consideration the above kinds of characteristics, to select the shape of either the stir probe 1 or 1A in response to the material and thickness of the to-be-joined members, the joint width and joining speed to be required, and the like.

A description has been given, in the first and second embodiments, of the case in which the lap joining is carried out by the friction stir processing, but the rotating tool 100, 100A disclosed in the present application can also be applied to butt joining or to material modification by friction stirring. Furthermore, the rotating tool 100, 100A can be applied not only to linear joining wherein a rotating tool is moved, but also to spot joining which processes to-be-joined materials by pressing a rotating tool against the to-be-joined materials without moving the rotating tool.

WORKING EXAMPLES

First Working Example

Figures 14, 15:
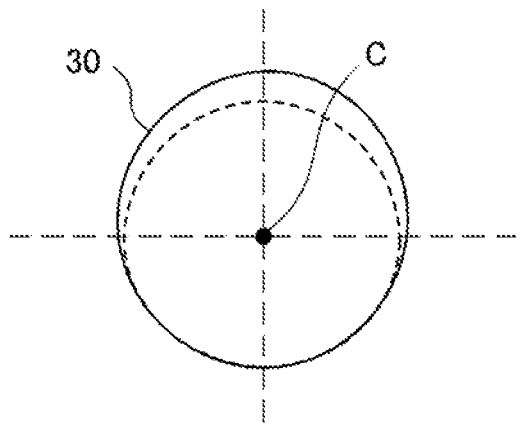
FIG. 14 is a sectional view showing a stir probe of the rotating tool according to the first comparison example.
FIG. 15 is a diagram showing results of friction stir welding by using rotating tools according to first and second working examples and the rotating tool according to the first comparison example.

In the first working example, A6063 and ADC12 aluminum alloy materials are lap joined by the friction stir welding using the rotating tool 100 (refer to FIG. 1) according to the first embodiment. In the first working example, when the joint depth is set to 1, the thickness of the to-be-joined members is 0.8, and the joint width thereof is 1.2. FIG. 15 shows the joining conditions (rotation speed and joining speed), the occurrence status of burr, and the damage occurrence joining distance in the first working example.

In FIG. 15, the occurrence status of burr is indicated in three stages: no occurrence of burr (circle), a small occurrence of burr (triangle), and an occurrence of burr (cross). Also, the damage occurrence joining distance means the distance of joining until damage to the stir probe occurs, providing an indication of the durability of the rotating tool. Furthermore, although not shown in FIG. 15, it is also confirmed whether or not there is a cavity defect caused by a decrease in the wall thickness of the joint portion.

In the first working example, favorable joining with no occurrence of burr or no occurrence of cavity defect is carried out even in high-speed joining wherein a high-speed rotation at a rotation speed of 15,000 rpm is combined with a high-speed movement at a joining speed of 3,000 mm/min. Furthermore, the damage occurrence joining distance under these joining conditions is 150 m, and it is confirmed that the rotating tool 100 is superior in durability and long in life to a common rotating tool for friction stir welding. In the first working example, the angle θ1 defined by the pressure receiving surface 2 and the rotation axis C is set to 45°, but in the range of 0°<θ1<90°, the same advantageous effects are obtained by the combination with the rotation speed.

Second Working Example

In the second working example, A6063 and ADC12 aluminum alloy materials of the same thickness as in the first working example are lap joined by the friction stir welding using the rotating tool 100A (refer to FIG. 10) according to the second embodiment. In the second working example, when the joint depth is set to 1, the thickness of the to-be-joined members is 0.8, and the joint width thereof is 1.2. FIG. 15 shows the joining conditions (rotation speed and joining speed), the occurrence status of burr, and the damage occurrence joining distance in the second working example.

In the second working example, favorable joining with no occurrence of burr or no occurrence of cavity defect is carried out even in high-speed joining wherein a high-speed rotation at a rotation speed of 10,000 rpm is combined with a high-speed movement at a joining speed of 1,000 mm/min. A small amount of burr is observed in high-speed joining wherein a high-speed rotation at a rotation speed of 15,000 rpm is combined with a high-speed movement at a joining speed of 3,000 mm/min, but the occurrence of cavity defect is not observed.

Also, the damage occurrence joining distance exceeds 100 m under any of the conditions, and it is confirmed that the rotating tool 100A, although inferior to that in the first working example, is superior in durability and long in life to a common rotating tool for friction stir welding. In the second working example, the angle θ2 defined by the pressure receiving surface 2 and the non-pressure receiving surface 3 is set to 60°, but in the range of 45°≤θ2<90°, the same advantageous effects are obtained by the combination with the rotation speed.

First Comparison Example

Figure 13:
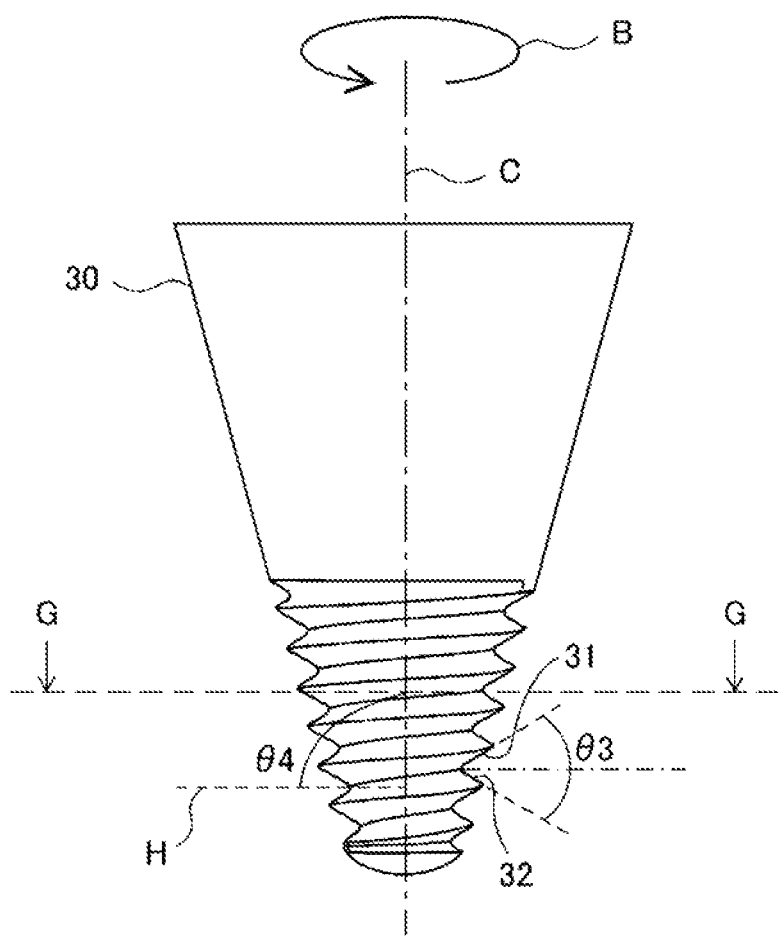
FIG. 13 is a side view showing a rotating tool according to a first comparison example.

FIG. 13 is a side view showing a rotating tool according to the first comparison example, and FIG. 14 is a sectional view of a stir probe according to the first comparison example with a cross section perpendicular to the rotation axis of the stir probe seen in the direction shown by G in FIG. 13. A rotating tool 30 according to the first comparison example is such that a thread groove is provided on the side surface of the stir probe in the same way as in a heretofore known common rotating tool. The thread groove has an anti-insertion side inclined surface 31 and an insertion side inclined surface 32.

The stir probe according to the first comparison example is of a tapered shape, wherein an angle θ3 of the thread groove is 60°, and an angle θ4 defined by a central line H of the thread groove and a rotation axis C is 90°. By adopting this kind of configuration, the area of the anti-insertion side inclined surface 31 can be made larger than the area of the insertion side inclined surface 32, producing the effect of suppressing the plastic flow in the rotation axis direction. However, as shown in FIG. 14, the cross-sectional shape of the stir probe according to the first comparison example is a smooth ellipse and does not have any pressure receiving region perpendicular to the rotation tangential direction.

A6063 and ADC12 aluminum alloy materials, the respective thicknesses of which are the same as in the first working example, are lap joined by friction stir welding using the rotating tool 30 according to the first comparison example. In the first comparison example, when the joint depth is set to 1, the thickness of the to-be-joined members is 0.8, the joint width thereof 2.6, the probe diameter 0.8, the probe length 1.0, and the shoulder diameter 2.5. FIG. 15 shows the joining conditions (rotation speed and joining speed), the occurrence status of burr, and the damage occurrence joining distance according to the first comparison example.

In the first comparison example, burr occurs in the combination of a rotation speed of 7,000 rpm and a joining speed of 600 mm/min. Also, in high-speed joining wherein a high-speed rotation at a rotation speed of 10,000 rpm is combined with a high-speed movement at a joining speed of 1,000 mm/min, a relatively large burr occurs, and an occurrence of cavity defect is observed. Also, with the rotating tool 30 according to the first comparison example, stress concentration occurs in the bottom portion of the thread groove, and so damage is likely to occur. Because of this, the damage occurrence joining distance is 50 m or less in any case, and it is confirmed that the rotating tool 30 is inferior in durability to those according to the first and second working examples.

Although the present, application is disclosed above in terms of various exemplary embodiments and implementations, it should foe understood that the various features, aspects, and functionality described in one or more of the individual embodiments are not limited in their applicability to the particular embodiment with which they are described, but instead can be applied, alone or in various combinations, to one or more of the embodiments. It is therefore understood that numerous modifications which have not been exemplified can be devised without departing from the scope of the present application. For example, at least one of the constituent components may be modified, added, or eliminated. At least one of the constituent components mentioned in at least one of the preferred embodiments may be selected and combined with the constituent components mentioned in another preferred embodiment.

What is claimed is:

1. A rotating tool for friction stir welding, comprising:
a stir probe, wherein
a pressure receiving surface inclined to a rotation axis of the stir probe and a non-pressure receiving surface parallel to the rotation axis are provided on a side surface of the stir probe, and the pressure receiving surface includes a pressure receiving region which is perpendicular to a rotation tangential direction in a cross section perpendicular to the rotation axis, at every rotational angle; wherein
the non-pressure receiving surface always intersects with the pressure receiving surface at the position of the maximum outer diameter of the pressure receiving region, where the pressure receiving surface forms angled spiral surfaces, and the non-pressure receiving surface is linear in a longitudinal section along the rotation axis without any concave surface between the angled spiral surfaces; and wherein
the outer diameter of the stir probe decreases toward a leading end portion and a surface area of the non-pressure receiving surface is larger than a surface area of the pressure receiving surface.

2. The rotating tool for friction stir welding according to claim 1, wherein
the pressure receiving surface is a spirally provided surface constituting the side surface of the stir probe.

3. The rotating tool for friction stir welding according to claim 1, wherein
the pressure receiving surface forms an angle of 0°<θ<90° with the rotation axis.

4. A method of friction stir welding which joins two or more metal members using a rotating tool including a stir probe, wherein
the stir probe has a pressure receiving region which is always perpendicular to a rotation tangential direction in a cross section perpendicular to a rotation axis, and the pressure receiving region is continuously formed along a side surface of the stir probe, thereby forming a pressure receiving surface inclined to the rotation axis, a non-pressure receiving surface parallel to the rotation axis is provided on a side surface of the stir probe, wherein the non-pressure receiving surface always intersects with the pressure receiving surface at the position of the maximum outer diameter of the pressure-receiving region, where the pressure receiving surface forms angled spiral surfaces, and the non-pressure receiving surface is linear in a longitudinal section along the rotation axis without any concave surface between the angled spiral surfaces, and the outer diameter of the stir probe decreases toward a leading end portion, a surface area of the non-pressure receiving surface is larger than a surface area of the pressure receiving surface, and wherein the rotating tool is caused to rotate in a direction in which the normal direction of the pressure receiving surface is positive, thus friction stir processing a joint portion between the metal members.

5. The rotating tool for friction stir welding according to claim 1, wherein the pressure receiving surface and the side surface of the stir probe are configured to suppress an occurrence of the burr by reducing a first plastic flow in the rotation axis direction and promoting a second plastic flow in a rotation direction perpendicular to the rotation axis direction.

6. The rotating tool for friction stir welding according to claim 1, wherein the pressure receiving surface and the side surface of the stir probe are configured to suppress an occurrence of the burr by reducing a first plastic flow in the rotation axis direction and promote a second plastic flow in a direction opposite to a movement direction of the rotating tool, from a forward side to a backward side of the rotating tool, in an advancing movement of the rotating tool perpendicular to the rotation axis direction.

7. The rotating tool of claim 1, wherein in the longitudinal section along the rotation axis, the pressure receiving surface and the non-pressure-receiving surface adjacent to each other perpendicularly intersect to form a step, the step has a shape of a 90 degree angle.

* * * * *